United States Patent
Rabii et al.

(10) Patent No.: US 10,313,982 B1
(45) Date of Patent: Jun. 4, 2019

(54) COOPERATIVE REALTIME MANAGEMENT OF NOISE INTERFERENCE IN ISM BAND

(71) Applicant: Thales Avionics, Inc., Irvine, CA (US)

(72) Inventors: Khosro Rabii, San Diego, CA (US); Jean-Yves Couleaud, Mission Viejo, CA (US); Pierre Schuberth, Corona del Mar, CA (US); Cedric Le May, Laguna Hills, CA (US)

(73) Assignee: THALES AVIONICS, INC., Irvine, CA (US)

( * ) Notice: Subject to any disclaimer, the term of this patent is extended or adjusted under 35 U.S.C. 154(b) by 106 days.

(21) Appl. No.: 15/499,248

(22) Filed: Apr. 27, 2017

(51) Int. Cl.
| | |
|---|---|
| *H04W 52/24* | (2009.01) |
| *H04W 4/04* | (2009.01) |
| *H04W 24/10* | (2009.01) |
| *H04B 17/327* | (2015.01) |
| *H04W 4/02* | (2018.01) |
| *H04W 76/15* | (2018.01) |
| *H04W 4/80* | (2018.01) |

(52) U.S. Cl.
CPC ........ *H04W 52/243* (2013.01); *H04B 17/327* (2015.01); *H04W 4/023* (2013.01); *H04W 4/046* (2013.01); *H04W 4/80* (2018.02); *H04W 24/10* (2013.01); *H04W 76/15* (2018.02)

(58) Field of Classification Search
CPC ..... H04W 52/243; H04W 76/15; H04W 4/80; H04B 17/327
See application file for complete search history.

(56) References Cited

U.S. PATENT DOCUMENTS

| | | | | |
|---|---|---|---|---|
| 5,970,395 | A * | 10/1999 | Weiler | G01R 29/08 455/67.13 |
| 7,215,698 | B2 * | 5/2007 | Darby | G01S 5/0081 132/260 |
| 7,715,853 | B1 * | 5/2010 | Frerking | H04B 7/18506 370/315 |
| 8,576,064 | B1 * | 11/2013 | Mitchell | H04L 67/36 340/539.1 |
| 8,781,512 | B1 * | 7/2014 | Grochla | H04W 48/18 370/252 |
| 9,077,655 | B2 * | 7/2015 | Babiarz | H04L 43/0876 |
| 9,504,084 | B2 * | 11/2016 | Niu | H04B 15/00 |
| 9,628,840 | B2 * | 4/2017 | Bleacher | H04N 21/422 |

(Continued)

*Primary Examiner* — Parth Patel
(74) *Attorney, Agent, or Firm* — Sage Patent Group

(57) ABSTRACT

An in-flight entertainment system includes a plurality of static transceivers and an ISM band communication interference manager. The static transceivers are configured to transmit and receive radio frequency signals in the ISM band. The static transceivers are further configured to measure signals received within the ISM band from mobile transceivers within the aircraft and to measure signals received from proximately located ones of the static transceivers, and to generate measurement reports containing the measurements and containing identifiers of the proximately located ones of the static transceivers and the mobile transceivers. The ISM band communication interference manager is communicatively connected to the static transceivers, and performs operations that include receiving the measurement reports from the static transceivers, and controlling transmission power levels used by the static transceivers and the mobile transceivers responsive to the content of the measurement reports.

24 Claims, 8 Drawing Sheets

(56) References Cited

U.S. PATENT DOCUMENTS

| | | | |
|---|---|---|---|
| 9,838,976 B1* | 12/2017 | Jorgovanovic | H04W 52/243 |
| 9,949,274 B2* | 4/2018 | Savoor | H04L 41/5019 |
| 2003/0192052 A1* | 10/2003 | Frisco | G06Q 30/02 |
| | | | 725/76 |
| 2005/0026608 A1* | 2/2005 | Kallio | H04B 7/18563 |
| | | | 455/431 |
| 2006/0271967 A1* | 11/2006 | So | H04B 1/205 |
| | | | 725/76 |
| 2007/0213009 A1* | 9/2007 | Higashida | H04B 7/18508 |
| | | | 455/62 |
| 2007/0258417 A1* | 11/2007 | Harvey | H04W 16/14 |
| | | | 370/338 |
| 2008/0057934 A1* | 3/2008 | Sung | H04W 52/243 |
| | | | 455/422.1 |
| 2009/0197538 A1* | 8/2009 | Borran | H04W 52/243 |
| | | | 455/63.1 |
| 2009/0279519 A1* | 11/2009 | Brisebois | H04W 52/242 |
| | | | 370/338 |
| 2010/0073250 A1* | 3/2010 | Noguchi | H01Q 1/28 |
| | | | 343/816 |
| 2010/0105329 A1* | 4/2010 | Durand | G06F 1/1632 |
| | | | 455/41.2 |
| 2010/0118844 A1* | 5/2010 | Jiao | H04W 24/02 |
| | | | 370/338 |
| 2010/0201570 A1* | 8/2010 | Shemar | G01S 5/10 |
| | | | 342/357.59 |
| 2011/0003606 A1* | 1/2011 | Forenza | H04B 17/318 |
| | | | 455/501 |
| 2011/0013560 A1* | 1/2011 | Zhang | H04W 52/146 |
| | | | 370/328 |
| 2011/0141933 A1* | 6/2011 | Kim | H04W 52/146 |
| | | | 370/252 |
| 2011/0235598 A1* | 9/2011 | Hilborn | H04W 52/143 |
| | | | 370/329 |
| 2012/0046026 A1* | 2/2012 | Chande | H04W 24/10 |
| | | | 455/422.1 |
| 2012/0094702 A1* | 4/2012 | Furueda | H04W 72/02 |
| | | | 455/501 |
| 2012/0142339 A1* | 6/2012 | Duan | H04W 72/08 |
| | | | 455/424 |
| 2012/0142392 A1* | 6/2012 | Patel | H04W 52/143 |
| | | | 455/522 |
| 2013/0237227 A1* | 9/2013 | Nagaraja | H04W 16/10 |
| | | | 455/436 |
| 2013/0294268 A1* | 11/2013 | Xu | H04W 72/082 |
| | | | 370/252 |
| 2013/0301423 A1* | 11/2013 | Sirotkin | H04W 4/90 |
| | | | 370/241.1 |
| 2013/0309987 A1* | 11/2013 | VanPatten | H04B 17/29 |
| | | | 455/226.2 |
| 2013/0310058 A1* | 11/2013 | Ibrahim | H04W 72/082 |
| | | | 455/452.1 |
| 2014/0036686 A1* | 2/2014 | Bommer | H04W 24/06 |
| | | | 370/241 |
| 2014/0036786 A1* | 2/2014 | Kazmi | H04W 52/146 |
| | | | 370/329 |
| 2014/0044095 A1* | 2/2014 | Li | H04W 16/14 |
| | | | 370/331 |
| 2014/0086212 A1* | 3/2014 | Kafle | H04B 17/345 |
| | | | 370/331 |
| 2014/0126403 A1* | 5/2014 | Siomina | H04W 24/10 |
| | | | 370/252 |
| 2014/0241282 A1* | 8/2014 | Mueller | H04B 7/18506 |
| | | | 370/329 |
| 2014/0315593 A1* | 10/2014 | Vrzic | H04W 52/38 |
| | | | 455/522 |
| 2014/0323170 A1* | 10/2014 | Chen | H04W 48/20 |
| | | | 455/501 |
| 2014/0368321 A1* | 12/2014 | Namgoong | G01S 3/04 |
| | | | 340/10.5 |
| 2014/0370928 A1* | 12/2014 | Ge | H04W 52/04 |
| | | | 455/522 |
| 2015/0245109 A1* | 8/2015 | Couleaud | H04N 21/2146 |
| | | | 725/77 |
| 2016/0027428 A1* | 1/2016 | Gul | G10K 11/1788 |
| | | | 381/71.4 |
| 2016/0050577 A1* | 2/2016 | Rao | H04W 48/18 |
| | | | 370/252 |
| 2016/0302211 A1* | 10/2016 | Hayashi | H04W 16/18 |
| 2017/0353202 A1* | 12/2017 | Gagey | H04B 1/1027 |
| 2018/0006690 A1* | 1/2018 | Shepard | H04B 7/0452 |
| 2018/0014261 A1* | 1/2018 | Miranda | H04W 16/14 |
| 2018/0034602 A1* | 2/2018 | Park | H04B 15/02 |
| 2018/0183501 A1* | 6/2018 | Qu | H04B 7/0456 |
| 2018/0241463 A1* | 8/2018 | Lu | H04B 7/18506 |
| 2018/0242158 A1* | 8/2018 | Tang | H04B 7/022 |

* cited by examiner

COOPERATIVE REALTIME MANAGEMENT OF NOISE INTERFERENCE IN ISM BAND

FIELD OF THE INVENTION

The present disclosure relates to aircraft-based in-flight entertainment systems that communicate with mobile terminals using Bluetooth and other ISM band communication links.

BACKGROUND

In-flight entertainment (IFE) systems have been deployed onboard aircraft to provide entertainment, such as movies, television, audio entertainment programming, electronic games, and other electronic content to passengers. IFE systems are increasingly using wireless access points to provide the electronic content from a content server to passenger equipment carried on-board (e.g., cellular phones, tablet computers, laptop computers), seat video display units (SVDUs), and other communication terminals within the aircraft. Some IFE systems provide passenger control units (PCUs) at passenger seats that are wirelessly linked to the seats' SVDUs, and which can be held by passengers and operated to control content selection and playback through the SVDUs. These wireless communications are typically performed within the industrial, scientific and medical (ISM) radio band.

The proliferation of such wireless equipment operating simultaneously and with unsynchronized use of the ISM radio resources within an aircraft cabin, can result in levels of communication interference that degrade or intermittently prevent operation of the IFE system. For example, hundreds of SVDU wireless transceivers and corresponding PCU wireless transceivers can be simultaneously interfering with each other's communications. Moreover, communications by these wireless transceivers would likely interfere with and be interfered with by the operation of wireless transceivers within hundreds of passengers' equipment.

The wireless transceivers are typically programmed to respond to degradation of their communication link quality by increasing their transmission power level. However, these operations can result in a rapid escalation of the signal noise floor within the cabin and further degrade or intermittently prevent operation of the IFE system.

SUMMARY

Some embodiments of the present disclosure are directed to an in-flight entertainment system that includes a plurality of static Bluetooth transceivers and an ISM band communication interference manager. The static transceivers are configured to transmit and receive radio frequency signals in the ISM band. The static transceivers are further configured to measure signals received within the ISM band from mobile transceivers within the aircraft and to measure signals received from proximately located ones of the static transceivers, and to generate measurement reports containing the measurements and containing identifiers of the proximately located ones of the static transceivers and the mobile transceivers. The manager is communicatively connected to the static transceivers, and performs operations that include receiving the measurement reports from the static transceivers, and controlling transmission power levels used by the static transceivers and the mobile transceivers responsive to the content of the measurement reports.

In some further embodiments, the measurement reports that are received from each of the static transceivers contain received signal strength measurements for signals received by the static transceiver from mobile transceivers and corresponding identifiers of the mobile transceivers from which the signals were received. The operations by the manager include comparing the received signal strength measurements contained in the measurement reports to identify an interfering mobile transceiver having a transmission power level that satisfies a rule indicating excessive interference to a plurality of the static transceivers. The operations further include identifying one of the static Bluetooth transceivers that is communicating with the interfering mobile transceiver, and communicating through a network a power control message addressed toward the identified one of the static Bluetooth transceivers that contains a command to reduce the transmission power level used by the interfering mobile transceiver.

Some other related embodiments of the present disclosure are directed to an ISM band communication interference manager that controls transmissions power levels from static and mobile transceivers. The manager includes a network interface that communicates with spaced apart static transceivers through a network, a processor coupled to the network interface, and a memory coupled to the processor and storing program code that when executed by the processor causes the processor to perform operations. The static transceivers are configured to transmit and receive radio frequency signals in the ISM band. The operations include receiving measurement reports from the static transceivers, where the measurement reports contain measurements of signals received in the ISM band by the static transceivers from mobile transceivers and received from proximately located ones of the static transceivers, and contain identifiers of the static transceivers and the mobile transceivers from which the signals were received. The operations further include controlling transmission power levels used by the static transceivers and the mobile transceivers responsive to the content of the measurement reports.

Other systems, ISM band communication interference managers, and/or methods according to embodiments of the inventive subject matter will be or become apparent to one with skill in the art upon review of the following drawings and detailed description. It is intended that all such additional systems, ISM band communication interference managers, and/or methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
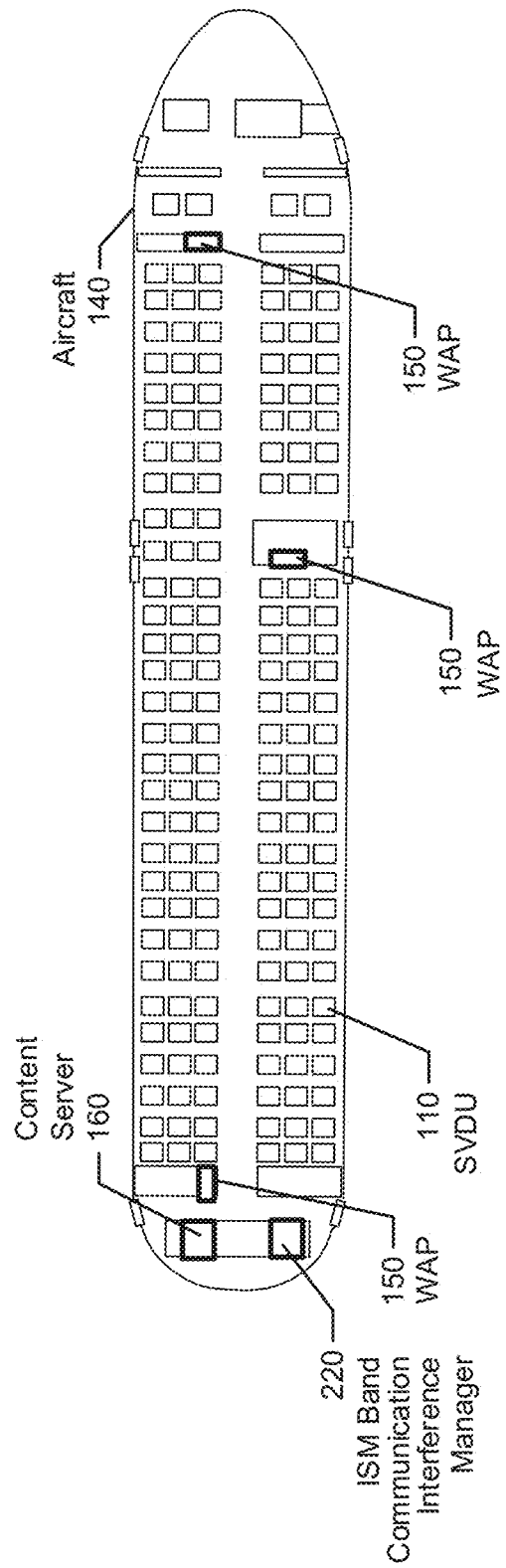
FIG. 1 illustrates an aircraft cabin containing an in-flight entertainment (IFE) system having a content server that streams electronic content through wireless access points (WAPs) to passenger equipment and/or through a wired network to seat video display units (SVDUs), in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, an aircraft cabin can have a very high density of wireless transceivers that are simultaneously attempting to use the same ISM frequency resources for communications. The resulting co-channel interference can degrade or preclude wireless communications within the aircraft cabin and, thereby, degrade or intermittently prevent operation of the IFE system. Moreover, the wireless transceivers would normally respond to increasing levels of interference by further increasing their transmission power levels and which, undesirably, further increases the interference problem.

Various embodiments of the present disclosure are directed to innovative operations and methods for centrally controlling the transmission power levels that are used by static transceivers and mobile transceivers in a high-density environment to reduce their interference to each other's communications.

As will be explained in further detail below, some embodiments are directed to an In-flight entertainment (IFE) system that includes a plurality of static Bluetooth transceivers and an ISM band communication interference manager. The static transceivers are configured to transmit and receive radio frequency signals in the ISM band. The static transceivers are further configured to measure signals received within the ISM band from mobile transceivers within the aircraft and to measure signals received from proximately located ones of the static transceivers, and to generate measurement reports containing the measurements and containing identifiers of the proximately located ones of the static transceivers and the mobile transceivers. The ISM band communication interference manager is communicatively connected to the static transceivers, and performs operations that include receiving the measurement reports from the static transceivers, and controlling transmission power levels used by the static transceivers and the mobile transceivers responsive to the content of the measurement reports.

Although various embodiments herein are primarily described in the context of an IFE system deployed onboard an aircraft, the invention is not limited thereto. Instead, these and other related embodiments may be used to control wireless communication transceivers located in other types of vehicles, including without limitation, trains, automobiles, cruise ships, and buses, and in other non-vehicle installations, including without limitation, meeting rooms, sports stadiums, etc.

Embodiments are also described in the context of the static and mobile transceivers being configured to transmit and receive using radio resources in the ISM band. As used herein, the term "ISM band" refers to one or more frequency ranges that are reserved internationally for the use of radio frequency energy for unlicensed and/or licensed communications. The term "band" can refer to one continuous frequency range or a plurality of non-continuous frequency ranges that are defined by the ITU Radio Regulations for ISM communications.

FIG. 1 illustrates an aircraft fuselage 140 containing an IFE system that provides entertainment services to passengers. The IFE system can include a content server 160 that streams and/or downloads electronic content through static transceivers within wireless access points (WAPs) 150 to other static transceivers within seat video display units (SVDUs) 110 that may be mounted to structures within the aircraft, including to seatbacks, seat armrests/frames, bulkheads, overhead structures, etc., and to mobile transceivers within passenger equipment carried on-board by passengers, such as mobile phones, tablet computers, laptop computers, etc. The SVDUs 110 may each contain a static transceiver that wirelessly communicates through ISM band RF signaling with mobile transceivers within passenger data units (PDUs) that may be releasable docked to an armrest docket station and/or a docket station connected to some/all of the SVDUs 110. When a static transceiver is within a SVDU 110, the static transceiver is understood to be the communication circuitry (i.e., transceiver, signal processor, etc.) which can be incorporated within the same housing that at least partially encloses a display device, video display circuitry, network interface, and other circuitry providing functionality for the SVDU 110.

The static transceivers are configured to transmit and receive RF signals in the ISM band for receipt by other static transceivers and/or mobile transceivers, and to measure signals received within the ISM band from mobile transceivers within the aircraft and to measure signals received from proximately located ones of the static transceivers. The static and mobile transceivers may communicate using one or more wireless communication protocols that can include, without limitation, IEEE 802.11 (e.g., WiFi), Bluetooth, 3GPP LTE, etc. The static transceivers generate measurement reports containing the measurements and containing identifiers of the proximately located ones of the static transceivers and the mobile transceivers. An ISM band communication interference manager 220 is communicatively connected through a network to receive the measurement reports from the static transceivers. The manager 220 is configured to control transmission power levels used by the static transceivers and the mobile transceivers responsive to the content of the measurement reports, as will be explained in further detail below.

Figure 2:
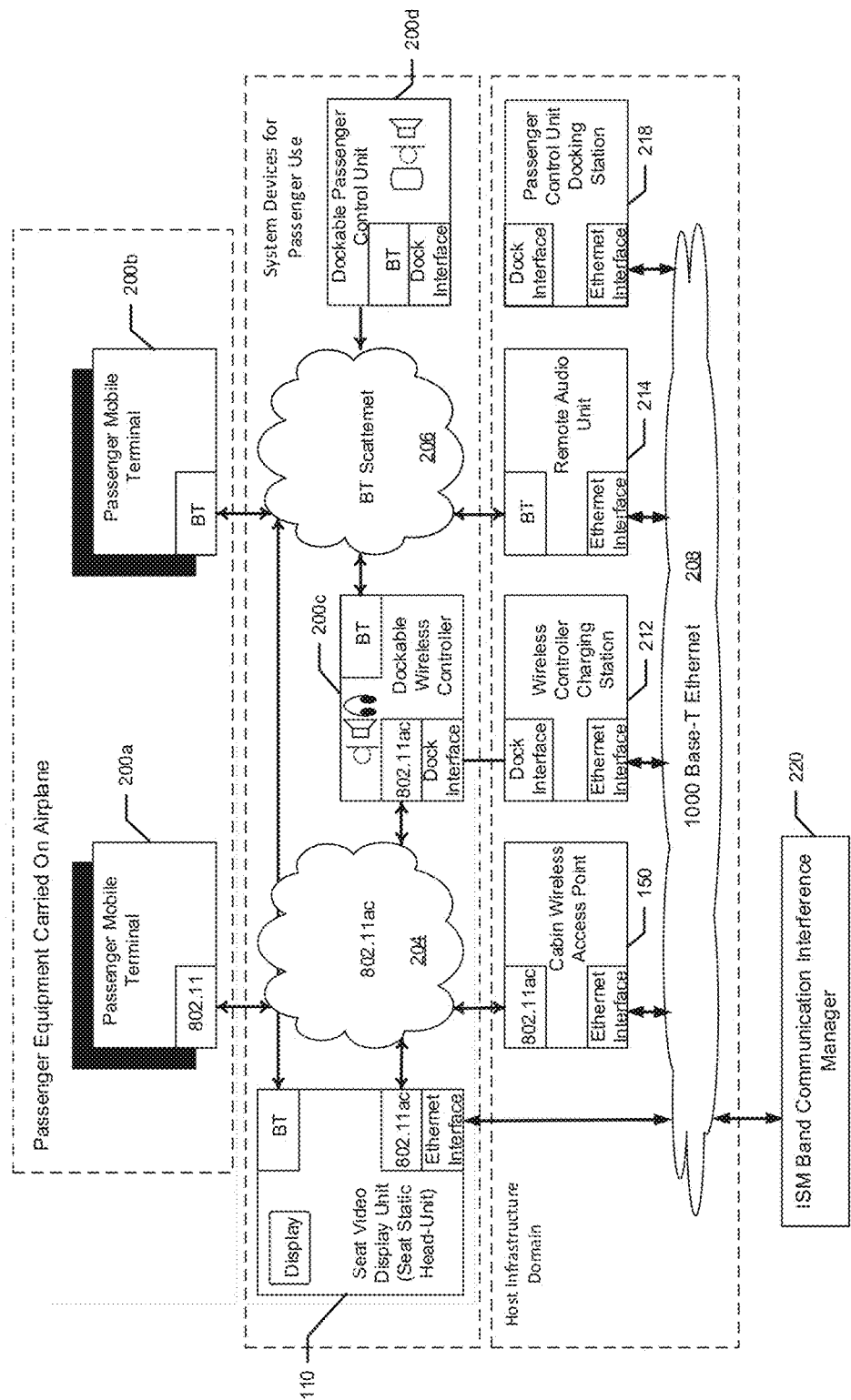
FIG. 2 is a block diagram illustrating the IFE system of FIG. 1 and an ISM band communication interference manager that is configured to operate in accordance with some embodiments of the present disclosure.

FIG. 2 is a block diagram of the IFE system and the ISM band communication interference manager 220 of FIG. 1 which are configured to operate in accordance with some embodiments of the present disclosure. Referring to FIG. 2, the IFE system includes system devices that can be located at each passenger seat location, and which is configured to communicate with various types of passenger equipment that can be carried on-board by passengers. The seat-located system devices can communicate using RF resources within the ISM band with the passenger equipment using an IEEE 802.11ac wireless network 204 and/or a Bluetooth (BT) scatternet wireless network 206. The example passenger equipment includes a passenger mobile terminal 200*a* having an IEEE 802.11 (WiFi) transceiver and another passenger mobile terminal 200*b* having a Bluetooth transceiver. Various other types of passenger equipment may include both WiFi and Bluetooth transceivers.

The located system devices can include a SVDU 110, a dockable wireless controller 200*c*, and a dockable passenger control unit 200*d*. The example SVDU 110 includes a display device, video display circuitry, a general-purpose processor, a Bluetooth transceiver, an 802.11ac (WiFi) transceiver, and an Ethernet interface or other wired network interface. The dockable wireless controller 200*c* includes a general-purpose processor, a Bluetooth transceiver, an 802.11ac (WiFi) transceiver, and a dock interface, and may include display circuitry connected to a display device, and audio decoding circuitry connected to a wired headphone jack and/or the Bluetooth transceiver for wireless communication with a passenger's wireless headset. The dockable passenger control unit 200*d* can similarly include a general-purpose processor, a Bluetooth transceiver, an 802.11ac (WiFi) transceiver, and a dock interface, and may include display circuitry connected to a display device, and audio decoding circuitry connected to a wired headphone jack and/or the Bluetooth transceiver for wireless communication with a passenger's wireless headset. The wireless controller 200*c* and the passenger control unit 200*d* may be configured as handheld devices for operation by passengers and/or may be mounted within the seat structure, such as within a seat armrest.

The seat-located system devices are connected to host infrastructure that can include the cabin wireless access points 150 spaced apart within the aircraft cabin and mounted to cabin ceiling structures, storage bin structures, bulkheads, etc. An Ethernet backbone network 208, e.g., 100 Base-T Ethernet, extends throughout the aircraft cabin to communicatively interconnect the seat-located system devices to the content server 160, the wireless access points 150, and the ISM band communication interference manager 220. The wireless access points 150 can each include an 802.11ac or other WiFi transceiver and an Ethernet interface that connects to the Ethernet backbone network 208.

The host infrastructure can include a wireless controller charging station 212, a passenger control unit docking station 218, and a remote audio unit 214. The wireless controller charging station 212 is located at each seat and has a dock interface that releasably stores the dockable wireless controller 200*c* and charges a battery therein, and has an Ethernet interface that connects to the Ethernet backbone network 208. The passenger control unit docking station 218 is also located at each seat and has a dock interface that releasably stores the dockable passenger control unit 200*d* and charges a battery therein, and has an Ethernet interface that connects to the Ethernet backbone network 208. The remote audio unit 214 may also be located at each seat or adjacent to a group of seats, and can contain a wired headphone jack, a Bluetooth transceiver, and an Ethernet interface that connects to the Ethernet backbone network 208, to receive and play audio through a loudspeaker and/or through the Bluetooth transceiver and/or the wired headphone jack to a headset worn by one or more passengers.

Because the SVDUs 110, the cabin wireless access points 150, the remote audio units 214, and the passenger control unit docking station 218 are mounted to fixed structures within the aircraft cabin, such as to seat frames, and communicate through a wired Ethernet interfaces to the Ethernet backbone network 208, the wireless transceivers within those devices are referred to herein as static transceivers. In contrast, because the passenger terminals and other passenger equipment, the dockable wireless controller 200*c*, and the dockable passenger control unit 200*d* can be transported within the aircraft cabin by passengers and communicate predominantly or exclusively through wireless transceiver interfaces, the wireless transceivers within those devices are referred to herein as mobile transceivers.

Each of the static transceivers is configured to transmit and receive radio frequency signals using carrier frequencies in the ISM band and to measure signals received within the ISM band from proximately located ones of the static transceivers and the mobile transceivers, and to generate measurement reports containing the measurements and containing identifiers of the proximately located ones of the static transceivers and the mobile transceivers. The static transceivers communicate the reports through their respective Ethernet interfaces and the Ethernet backbone network 208 to the ISM band communication interference manager 220.

Figure 3:
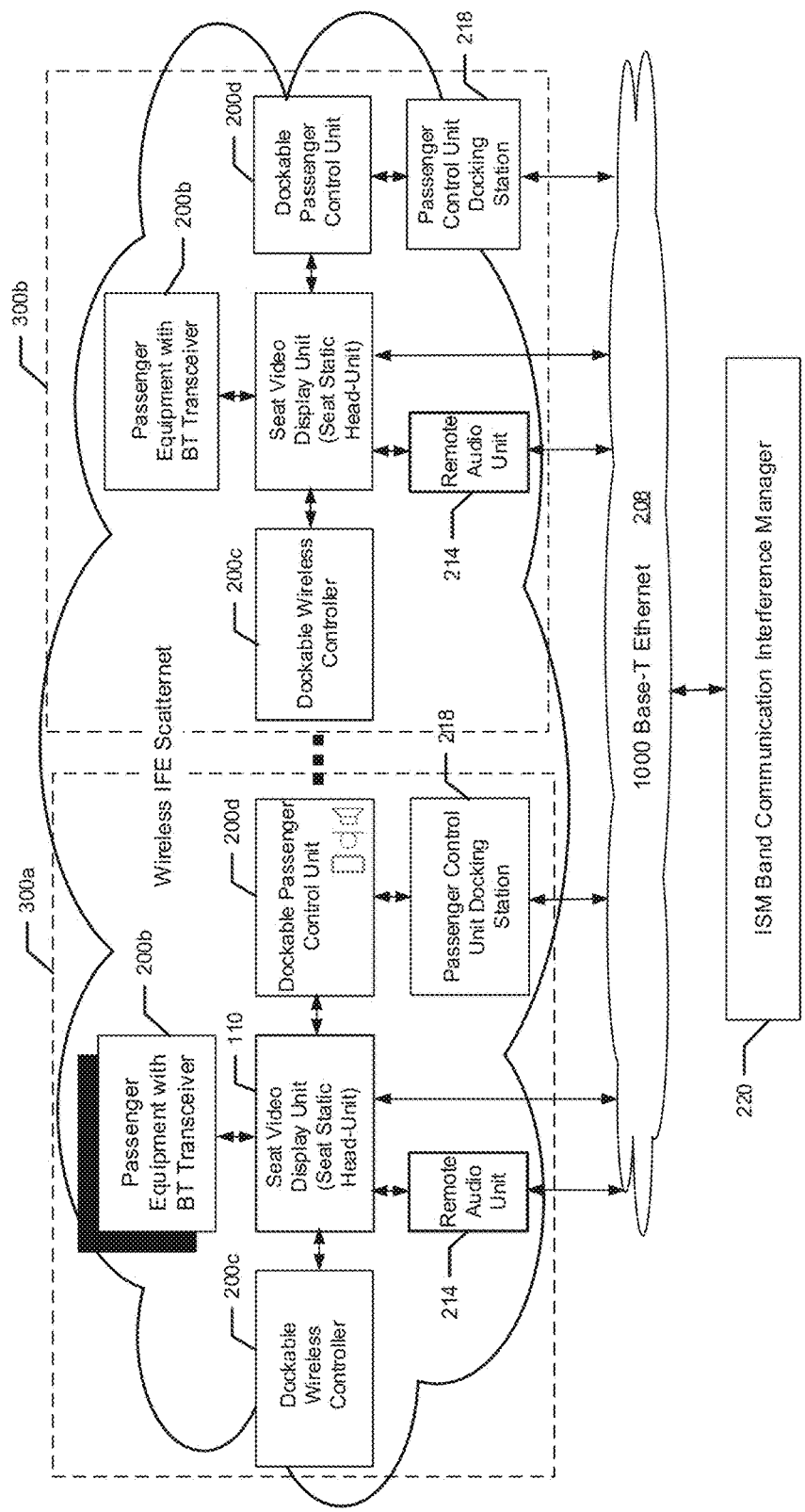
FIG. 3 is another block diagram of the IFE system and the ISM band communication interference manager of FIGS. 1-2 which are configured to operate in accordance with some embodiments of the present disclosure.

FIG. 3 is another block diagram of the IFE system and the ISM band communication interference manager of FIGS. 1-2 which are configured to operate in accordance with some embodiments of the present disclosure. Referring to FIG. 3, an example configuration of components is illustrated for two spaced apart seat locations 300*a* and 300*b*. Each seat location 300*a*/300*b* is illustrated as being configured to include a passenger equipment with Bluetooth transceiver 200*b*, a dockable wireless controller 200*c*, a SVDU 110, a dockable passenger controller unit 200*d*, a remote audio unit 214, and a passenger control unit docking station 218. These per-seat component configurations can be replicated for any number of seat locations, and one or more of the components that is illustrated as being replicated at each seat location may instead be connected to serve components at more than one seat location.

Each of the SVDUs 110 can thereby operate to reliably measure strength of RF transmissions in the ISM band within its range of reception, and to report the measurements to the ISM band communication interference manager 220 for use in controlling transmission power levels used by the static transceivers and the mobile transceivers. The collection of all SVDUs 110 dispersed along the aircraft cabin thereby form a sensor network that measures strength of RF transmissions throughout the aircraft cabin, and facilitates the ISM band communication interference manager 220 operating to separately control the transmission power levels of selected ones of the static and mobile transceivers to cooperatively mitigate communication interference (including RF noise) and/or communication congestion in order to provide at least a defined level of Quality of Service and/or Quality of Experience to system applications and/or services at defined locations and/or across all locations within the aircraft cabin.

The mobile transceivers and static transceivers can measure source received signal strength (e.g., to generate received signal strength indicator (RSSI) values) and/or estimate channel-state/link-quality (e.g., signal-to-interference-plus-noise ratio (SNIR)) by measuring forward error correction (FEC) and/or cyclic redundancy check (CRC) error rates which the transceivers can use to control the source transceivers transmit power level. The RSSI can be measured as the total received wideband power measured by the receiving transceiver within a defined bandwidth. The received signal strength may be determined as a linear average of the total received power in the measured bandwidth over a defined number of resource blocks. In accordance with various embodiments herein, the measurements can be reported to the ISM band communication interference manager 220 which uses the measurements to control transmission power levels used by the static transceivers and the mobile transceivers.

Figure 4:
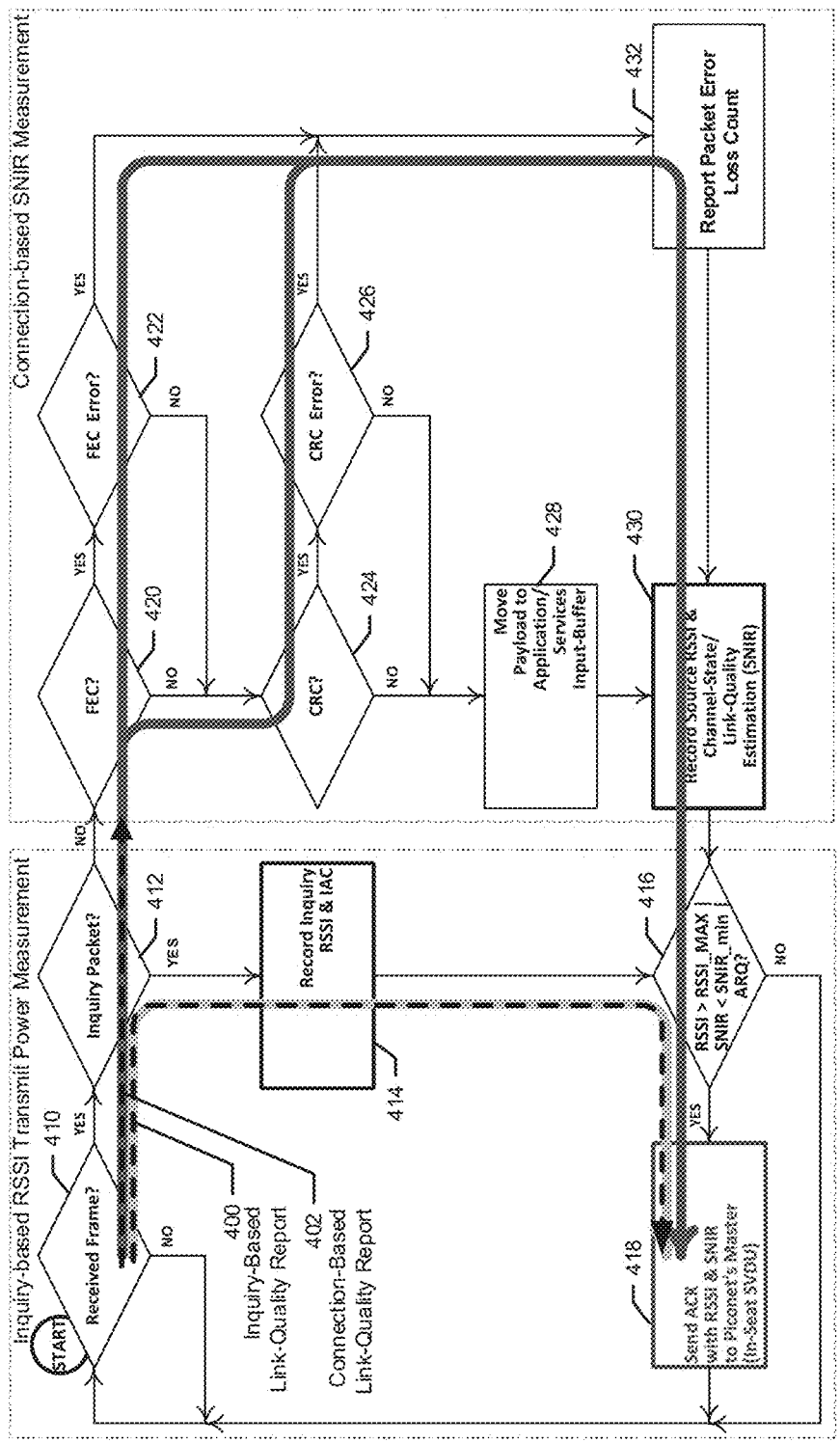
FIG. 4 is a combined flowchart and data flow diagram of operations and methods performed by mobile transceivers to generate measurement reports sent to the static transceivers of the IFE system of FIGS. 1-3 in accordance with some embodiments of the present disclosure.

FIG. 4 is a combined flowchart and data flow diagram of operations and methods performed by mobile transceivers to generate measurement reports sent to the static transceivers of the IFE system of FIGS. 1-3 in accordance with some embodiments of the present disclosure. Two reporting pathways are illustrated in FIG. 4: an inquiry-based link-quality report generation pathway 400; and a connection-based link-quality report generation pathway 402.

Referring first to the inquiry-based link-quality report generation pathway 400, the associated operations for performing an inquiry-based RSSI transmit power measurement can include determining (block 410) receipt of a frame from a source transceiver by further determining (block 412) whether a receive packet is an inquiry packet and, if so, the transceiver operates (block 414) to record the inquiry RSSI and inquiry access code (IAC). A determination (416) is made whether the RSSI is greater than a defined RSSI_Max and whether the SNIR is less than a defined SNIR_Min and, if so, a measurement report is generated (block 418) that includes an acknowledgement (ACK) message and RSSI and SNIR measurements, to the wireless network's master transceiver device (e.g., the static transceiver in the SVDU 110).

Referring now to the connection-based link-quality report generation pathway 402, following a negative determination at block 412 the associated operations for performing a connection-based SNIR measurement can include determining (block 420) whether the packet includes a forward error correction value and, if so, a further determination (block 422) is made whether the FEC value contains an error and, if so, a packet error loss count report is generated (432) and provided as part of a record generated (block 430) to also contain the source RSSI & channel-state/link-quality estimation (SNIR), for sending (block 418) as a measurement report to the wireless network's master transceiver device (e.g., the static transceiver in the SVDU 110).

In contrast when the decisions of blocks 420 or 422 are negative, a further determination (block 424) is made whether the packet contains a CRC and if so, another determination is made whether the CRC contains an error and, if so, the operational flow continues to block 432 to perform the resulting operations described above. In contrast, when the decisions of blocks 424 or 426 are negative, the packet payload is moved (block 428) to the application/services input buffer, and the operations then continue to block 430 to generate a record that contain the source RSSI & channel-state/link-quality estimation (SNIR), for sending (block 418) as a measurement report to the wireless network's master transceiver device (e.g., the static transceiver in the SVDU 110).

The static transceiver and/or mobile transceivers within or used with the IFE system may measure received signal strength of advertisement signals, discovery signals, and/or synchronization signals that are transmitted by other transceivers. The measurements can be indicated by content of measurement reports that are communicated to the manager 220 for use in controlling transmission power levels used by the static transceivers and the mobile transceivers. When a connection has been established between a SVDU 110 (i.e., static transceiver) and a wireless controller 200c or passenger control unit 200d (i.e., a mobile transceiver), the static transceiver of the SVDU 110 can continuously measure the RSSI of signals received from the mobile transceiver to adjust the transmission power level of the static and mobile transceivers in order to reduce communication errors and save power. Furthermore, the static transceiver of the SVDU 110 can measure any inquiry message RSSI for use in controlling overall interference and noise in the Bluetooth scatter net. Assuming the inquirer uses static transmission power, the inquiry-based RSSI can be used to determine the distance between the static transceiver of the SVDU 110 and the mobile transceiver of the wireless controller 220c or passenger control unit 200d. The inquiry-response RSSI of a transceiver that is measured with respect to a plurality of spaced part static transceivers in SVDUs 110 can be used to identify and reliably locate mobile transceivers that are termed rogue because they are demonstrating operational unresponsiveness to requests to them to reduce their transmission power level and/or because they are otherwise transmitting at power levels that are causing excessive interference to other transceivers.

Figure 5:
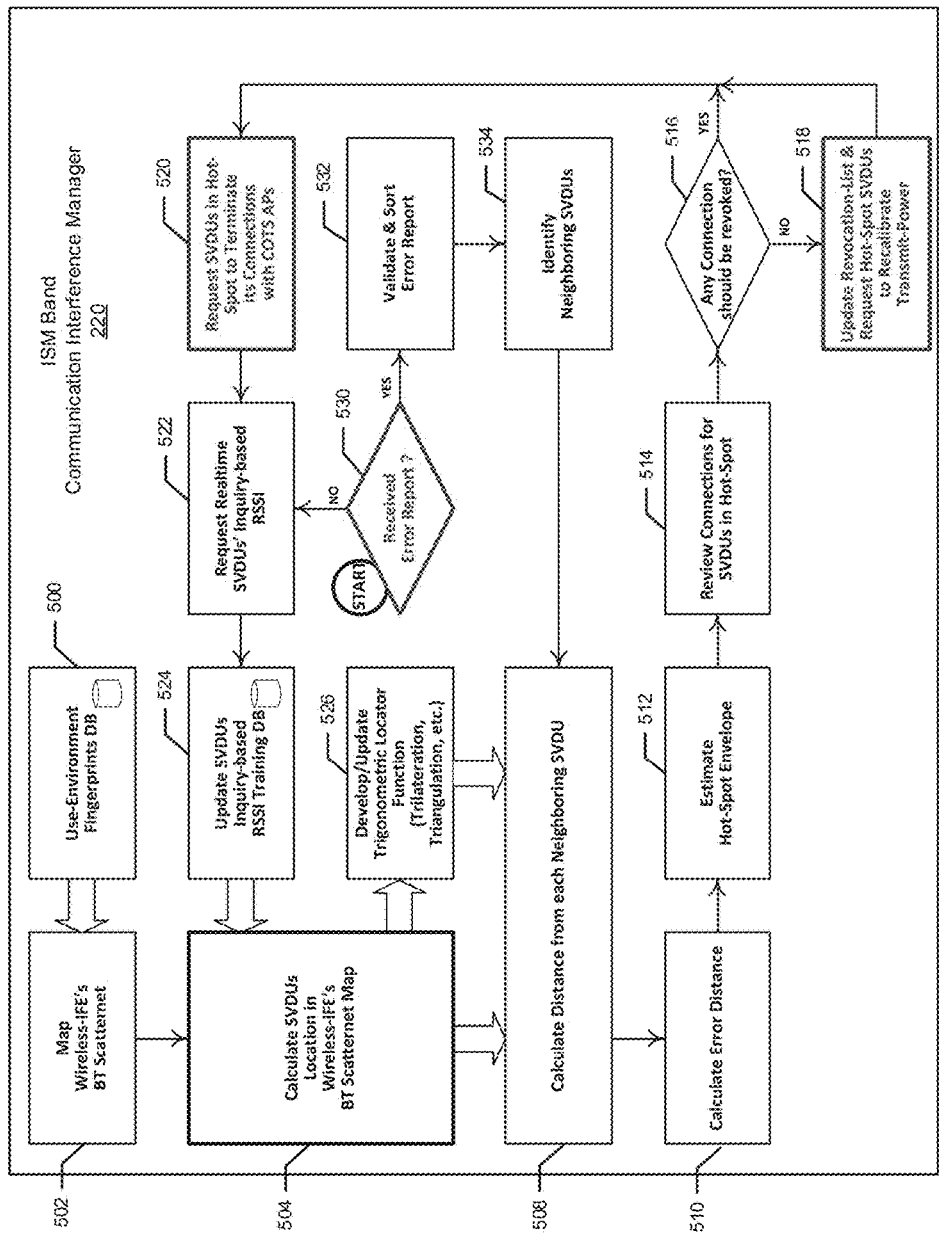
FIG. 5 is a combined flowchart and data flow diagram of operations and methods performed by the ISM band communication interference manager of FIGS. 2-3 in accordance with some embodiments of the present disclosure.

FIG. 5 is a combined flowchart and data flow diagram of operations and methods performed by the ISM band communication interference manager 220 of FIGS. 2-3 in accordance with some embodiments of the present disclosure.

Referring to FIG. 5, the manager 220 receives (block 530) measurement reports, which may include an error report of excessive communication interference, from the static transceivers throughout the aircraft cabin. The measurement reports contain the signal measurements and identifiers of the static transceivers and mobile transceivers from which the signals were received.

The manager 220 may additionally or alternatively request (block 522) the static transceivers, e.g. in the SVDUs 110, to provide inquiry-based RSSI measurement reports to the manager 220. The manager 220 uses the inquiry-based RSSI measurement reports received from the static transceivers to update (block 524) a database (DB). The manager 220 can access (block 500) a use-environment fingerprints database (DB) to obtain (block 502) a map listing in a data structure containing the unique identifiers of the wireless transceiver that are in the Bluetooth (BT) scatternet throughout the aircraft cabin. The manager 220 calculates (block 504) the location of the static transceivers in the SVDUs 110 and of other transceivers in the map listing, and uses (block 526) a trigonometric locator function, which may include trilateration operations, triangulation operations, etc., to calculate (block 508) the distances between the transceivers.

In some embodiments, the manager 220 determines distances between the static transceivers based on received signal strength measurements indicated by the measurement reports of signals received by the static transceivers from other ones of the static transceivers, and determines the relative directions between the static transceivers based on triangulating the determined distances between the static transceivers identified by the measurement reports. The manager 220 generates a cabin layout map that identifies the distances and relative directions between the static transceivers, and which is stored in the data structure of the database. The manager 220 then uses the cabin layout map and the relative strengths of the signals received by the static transceivers from the other static transceivers, to determine maximum transmission power levels that each of the static transceivers should stay below when transmitting to mobile transceivers, and communicates through the network power control messages addressed toward each of the static transceivers that contains a command indicating the maximum transmission power levels determined for the static transceiver.

In some other embodiments, the manager 220 determines distances between the static transceivers based on received signal strength measurements indicated by the measurement reports of signals received by the static transceivers from other ones of the static transceivers, and determines the relative directions between the static transceivers based on triangulating the determined distances between the static transceivers identified by the measurement reports. The manager 220 generates a cabin layout map that identifies the distances and relative directions between the static transceivers, and which is stored in the data structure of the database. The manager 220 then determines based on the cabin layout map and the received signal strength measurements indicated by the measurement reports of signals received by the static transceivers from other ones of the static transceivers, transmission power levels that each of the static transceivers are using to communicate with mobile transceivers. Based on the transmission power levels that each of the static transceivers are determined to be using to communicate and based on the distances and relative directions between the static transceivers indicated by the cabin layout map, the manager 220 communicates through the network power control messages addressed toward the static transceivers that contain commands controlling the transmission power levels used by the static transceivers.

The manager 220 can calculate (block 510) an error in the distance calculations which can be used, for example, to proportionally moderate the amount of change that the manager 220 instructs a transceiver to make to its transmission power level (e.g., higher distance error results in smaller step change in transmission power level for a given measured received signal strength). The manager 220 estimates (block 512) a hot-spot envelope, which may correspond to an average or other statistical operation performed on the transmission power levels that have been measured in reports from across a group of static transceivers that are within a determined distance of a defined location. The defined location may correspond to where a transceiver is located which is determined to be transmitting at a highest transmission power level relative to at least some other transceivers within the group of static transceivers.

For example, in some embodiments the manager 200 compares the received signal strength measurements contained in the measurement reports to identify a first group of the static transceivers that are using transmission power levels that are more than a threshold amount greater than an average transmission power level used by a second group of the static transceivers that is proximately located to, e.g., determined to be within a defined distance of, the first group of the static transceivers. The manager 200 then communicates through the network power control messages addressed toward the first group of the static transceivers that contain commands to reduce the transmission power level used by the first group of the static transceivers. In this manner, proximately located groups (areas) of transceivers within the aircraft cabin that are more than a threshold amount of power above other proximately located groups of transceivers, may be commanded to reduce their transmission power level in order to reduce interference to communications by the other proximately located groups of transceivers. A hotspot area where high transmission power signaling is occurring can be mitigated by the manager 220 controlling the transceivers within the area of the hotspot to reduce the transmission power levels. These operations can thereby reduce interference to communications between other nearby transceivers.

The manger 220 may control the transmission power level that is used by a transceiver by setting a maximum power level that the transceiver can use to transmit signals. The manager 220 may separately control different groups of transceivers to have different maximum transmission power levels. The maximum transmission power level that is determined for use by each group of transceivers may be determined based on the manager 220 iteratively determining a maximum transmit power level that is shown to provide a defined level of Quality of Service and/or Quality of Experience, which the manager 220 can determine from content of the measurement reports received from the transceivers within the group. The manager 220 may iteratively vary the maximum transmit power level that is used by transceivers within the group to determine from content of the resulting measurement reports what maximum transmit power level will allow the transceivers to achieve the defined level of Quality of Service and/or Quality of Experience.

Some further embodiments, the manager 220 determines (block 516) whether a connection to a mobile transceiver should be revoked and, if so, the manager 220 generates a request message that is communicated to the static transceiver, e.g., within the SVDU 110, which is connected to the mobile transceiver. The request message instructs the static transceiver to terminate its connection with the mobile transceiver. The decision (block 516) to revoke a connection with a mobile transceiver may be made based on received signal measurements of signals from the mobile transceiver being above a threshold transmission power level and/or based on the mobile transceiver ignoring earlier commands from the manager 220 via a static transceiver to reduce the transmission power level of mobile transceiver.

When the determination (block 516) is not to revoke a connection, a revocation-list is updated to reflect that determination, and a power control message is communicated from the manager 220 through the network addressed toward and identified one of the static transceivers is communicating with the mobile transceiver, that instructs the static transceiver to adjust (e.g., recalibrate) the transmission power level of itself and/or the mobile transceiver.

Figure 6:
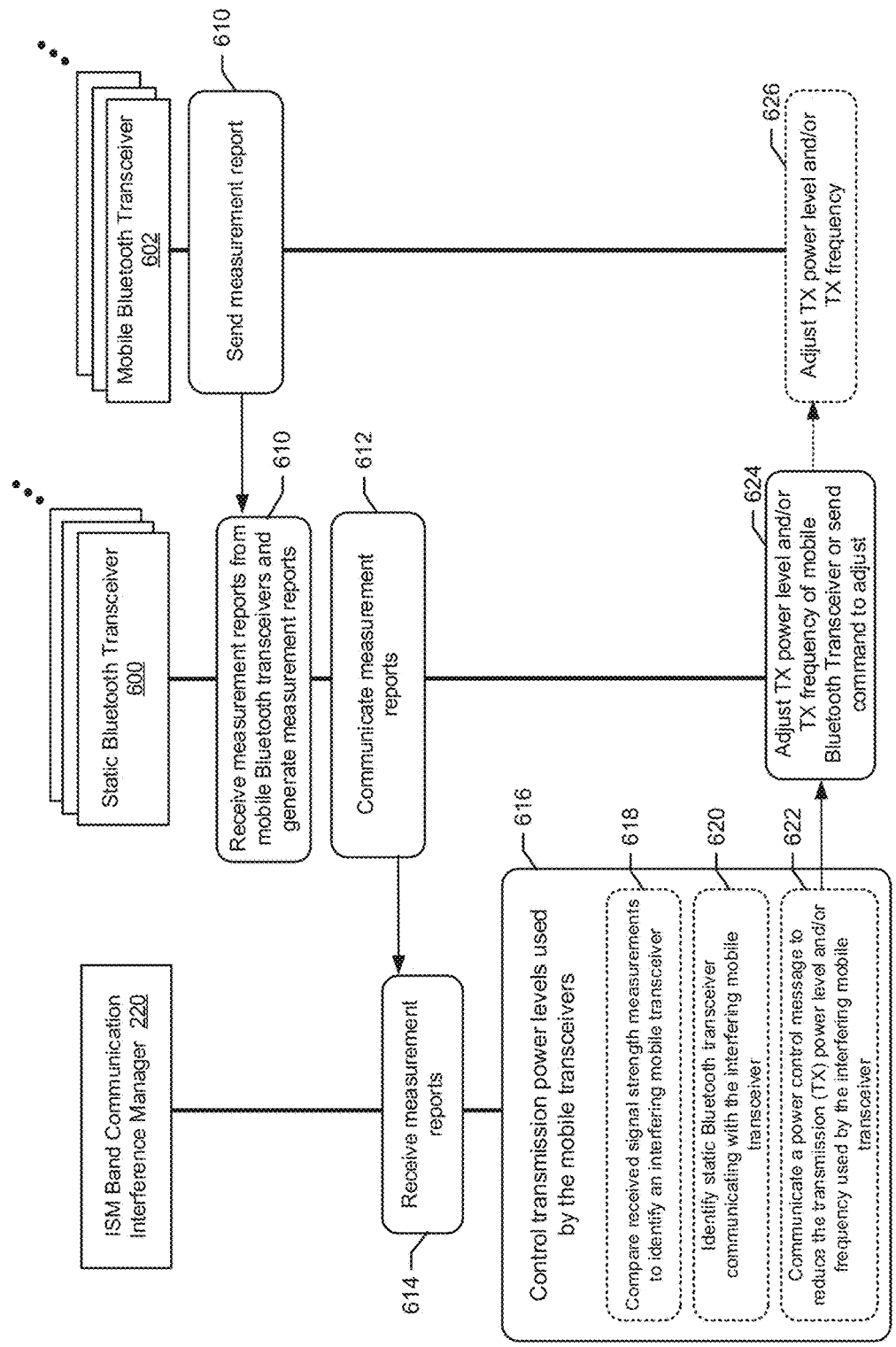
FIG. 6 is a flowchart of operations and methods performed by the ISM band communication interference manager of FIGS. 2-3 and 5 in accordance with some embodiments of the present disclosure.

FIG. 6 is a flowchart of operations and methods performed by the ISM band communication interference manager 220 of FIGS. 2-3 and 5 in accordance with some embodiments of the present disclosure.

Referring to FIG. 6, a mobile Bluetooth transceiver 602 sends (block 608) a measurement report to the static Bluetooth transceiver 600. The static Bluetooth transceiver 600 measures (e.g., RSSI) signals received within the ISM band from mobile transceiver 602 and measures signals received from proximately located ones of the static Bluetooth transceivers, and generates a measurement report containing the measurements and containing identifiers of the proximately located ones of the static Bluetooth transceivers and the mobile Bluetooth transceiver 602. The measurement report may also include a measurement by the mobile Bluetooth transceiver 602 of signals it received from the static Bluetooth transceiver 600, and which was sent (block 608) to the static Bluetooth transceiver 600. The static Bluetooth transceiver 600 communicates (block 610) the measurement report to the manager 220 through a network (e.g., the Ethernet backbone network)

The manager 220 receives (block 614) the measurement report, and controls (block 616) transmission power levels used by the static Bluetooth transceiver 600 and/or the mobile Bluetooth transceiver 602 responsive to the content of the measurement report. To control the transmission power level, the manager 220 communicates a power control message through the network that is addressed toward the static Bluetooth transceiver 600 that contains a command causing the static Bluetooth transceiver 600 to reduce (block 624) its transmission power level and/or a command to reduce the transmission power level used by the mobile Bluetooth transceiver 602. When the command is to reduce the transmission power level used by the mobile Bluetooth transceiver 602, the static Bluetooth transceiver 600 responsively transmits (block 624) a command instructing the mobile Bluetooth transceiver 602 to reduce (block 626) its transmission (TX) power level.

The operations for controlling (block 616) the transmission power level can include comparing the received signal strength measurement(s) contained in the measurement report to identify whether the mobile Bluetooth transceiver 602 has a transmission power level that satisfies a rule indicating excessive interference to the static Bluetooth transceiver 600 and other static transceivers. Responsive to the rule being satisfied, the manager 220 determines an addressable identity of the static Bluetooth transceiver 600 that is communicating with the mobile Bluetooth transceiver 602, and communicates through the network a power control message addressed toward the static Bluetooth transceiver 600 that contains a command to reduce the transmission power level used by the mobile Bluetooth transceiver 602.

In some situations, the mobile Bluetooth transceiver 602 may, through erroneous or maliciously programmed operation, disregard power control commands from the static Bluetooth transceiver. In such situations the mobile Bluetooth transceiver 602 is referred to as operating as a rogue Bluetooth transceiver. The manager 220 may therefore be configured to operate to isolate a rouge Bluetooth transceiver to minimize its interference to the static and mobile Bluetooth transceivers. The operations can include determining from further received measurement reports from the static Bluetooth transceiver 600 that the mobile Bluetooth transceiver 602 has not reduced or sufficiently reduced its transmission power level responsive to the power control command. The manager 220 then responsively operates to generate a carrier frequency change message that it communicates toward the static Bluetooth transceiver 600 for transmission to the mobile Bluetooth transceiver 602. The carrier frequency change message contains a command for the mobile Bluetooth transceiver 602 to use a carrier frequency for transmission that is outside a group of frequencies that the manager 220 is reserving for use by the static transceivers, including the static Bluetooth transceiver 600, to continue communications with mobile transceivers other than the mobile Bluetooth transceiver 602.

In some related embodiments, the operations that can be performed by the manager 220 for controlling transmission power levels used by the static transceivers and/or the mobile transceivers can include identifying, based on the measurement report that it receives, an interfered one of the static Bluetooth transceivers that is subjected to communication interference that exceeds a defined rule. The manager 220 then responsively operates to identify one of the static transceivers which is proximately located to the interfered one of the static transceivers, and communicates through the network a power control message addressed toward the identified one of the static transceivers that contains a command to reduce the transmission power level used by the identified one of the static transceivers and/or to reduce the transmission power level used by at least one of the mobile transceivers communicating with the identified one of the static transceivers.

In some further operations of the related embodiments, the power control message contains a command to reduce the transmission power level used by a particular mobile transceiver communicating with the identified one of the static transceivers. The operations by the manager 200 further include identifying that the particular mobile transceiver is a rogue mobile transceiver based on it not reducing or sufficiently reducing its transmission power level responsive to the command, and generating a frequency change message communicated through the identified one of the static transceivers for transmission to the rogue mobile transceiver that contains a command for the rogue mobile transceiver to use a frequency for transmission that is outside a group of frequencies that the ISM band communication interference manager is reserving for use by the static transceivers to communicate with mobile transceivers other than the interfering mobile transceiver.

In some further operations of the related embodiments, the frequency change message is configured as a connection request message that identifies the frequency at which the rogue mobile transceiver is to transmit connection setup information to the identified one of the static transceivers. Alternatively or additionally, the operations may further include generating the frequency change message configured as a pairing request message identifying the frequency at which the rogue mobile transceiver is to transmit pairing information to the identified one of the static transceivers.

The operations for identifying that the particular mobile transceiver is a rogue mobile transceiver based on it not reducing or sufficiently reducing its transmission power level responsive to the command, can include monitoring measurement reports received from the static transceivers to determine whether the mobile transceivers are sufficiently changing their transmission power levels responsive to the transmission power level control commands contained in the power control messages communicated through the static transceivers.

The power control message may be generated to contain a command to reduce the transmission power level used by a particular mobile transceiver communicating with the identified one of the static transceivers. The more operations by the manager 220 may include identifying that the particular mobile transceiver is a rogue mobile transceiver based on it not reducing or sufficiently reducing its transmission power level responsive to the command, and further identifying that the rogue mobile transceiver is a passenger control unit (PCU) that is paired through a Bluetooth wireless link to a seat video display unit (SVDU) having a housing containing the identified one of the static transceiver. Responsive to the rouge mobile transceiver being a PCU, the manager 220 can operate to generate a passenger request message communicated to the SVDU that contains a request configured for display on a display device of the SVDU instructing a passenger to return the PCU to a dock device that associated with the SVDU and configured to releasably store the PCU.

The power control message may be configured to contain a command to reduce the transmission power level used by the identified one of the static transceivers to communicate with a particular mobile transceiver. The more operations by the manager 220 may include identifying that the particular mobile transceiver is a rogue mobile transceiver based on it sending signal measurement reports that incorrectly indicate low received signal strengths to the identified one of the static transceivers that are causing excessively high levels of transmission power from the identified one of the static transceivers. The manager 220 can operate to responsively generate a disregard report message communicated toward the identified one of the static transceivers instructing the identified one of the static transceivers to not use measurement reports that are received from the rogue mobile transceiver when determining what transmission power level the identified one of the static transceivers will use for transmissions.

Figure 7:
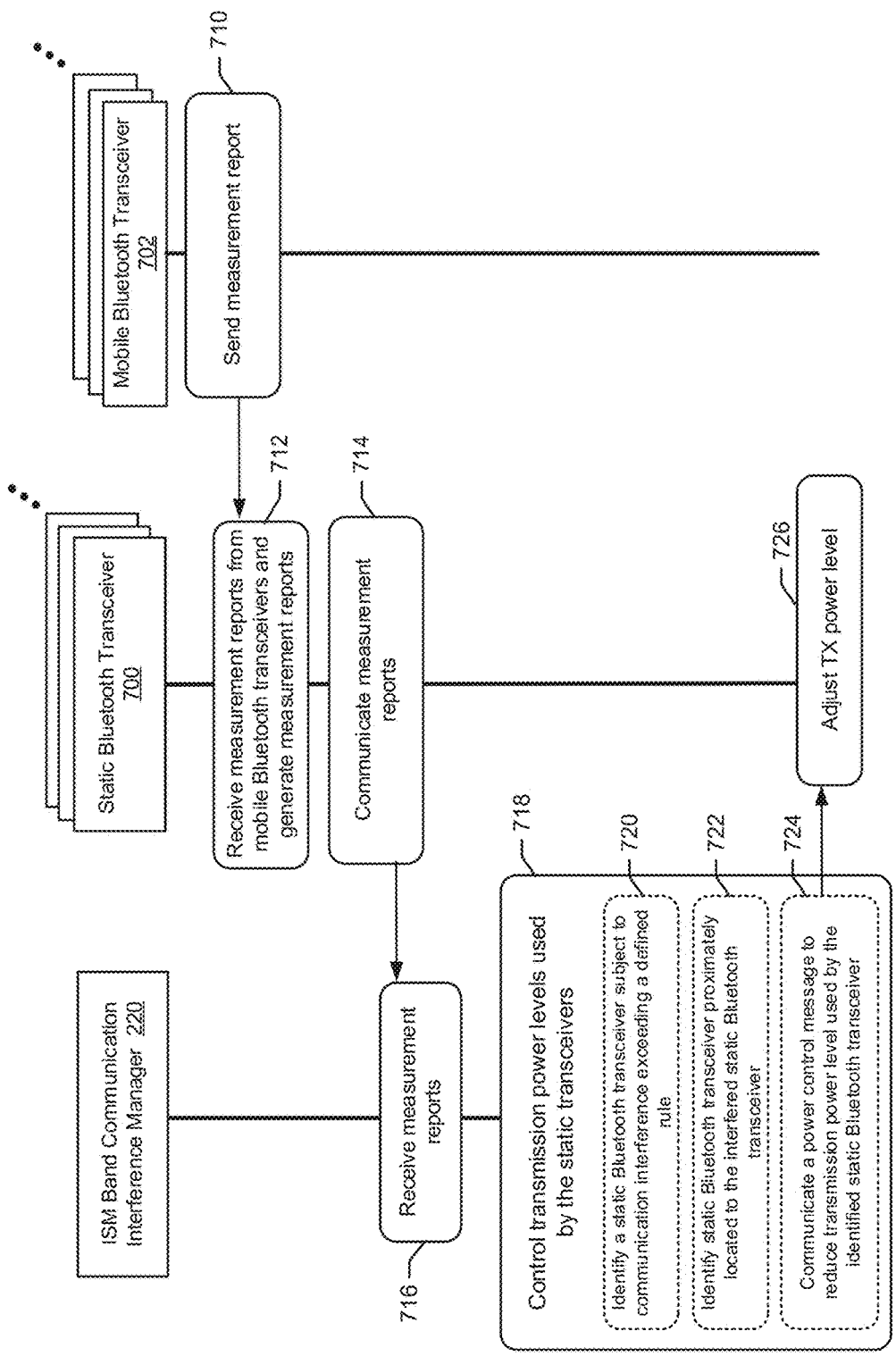
FIG. 7 is a flowchart of other operations and methods performed by the ISM band communication interference manager of FIGS. 2-3 and 5 in accordance with some embodiments of the present disclosure.

FIG. 7 is a flowchart of other operations and methods performed by the ISM band communication interference manager 220 of FIGS. 2-3 and 5 in accordance with some embodiments of the present disclosure.

Referring to FIG. 7, a mobile Bluetooth transceiver 702 sends (block 710) a measurement report to the static Bluetooth transceiver 700. The static Bluetooth transceiver 700 measures (e.g., RSSI) signals received within the ISM band from mobile Bluetooth transceiver 702 and measures signals received from proximately located ones of the static Bluetooth transceivers, generates a measurement report containing the measurements and containing identifiers of the proximately located ones of the static Bluetooth transceivers and the mobile Bluetooth transceiver 702. The measurement report may also include a measurement by the mobile Bluetooth transceiver 702 of signals it receives from the static Bluetooth transceiver 700, and which was sent (block 710) to the static Bluetooth transceiver 700. The static Bluetooth transceiver 700 communicates the measurement report to the manager 702 through a network (e.g., the Ethernet backbone network)

The manager 220 receives (block 716) the measurement report, and controls (block 718) transmission power levels used by the static Bluetooth transceiver 700 responsive to the content of the measurement report. To control the transmission power level, the manager 220 communicates a power control message through the network that is addressed toward the static Bluetooth transceiver 700 that contains a command causing the static Bluetooth transceiver 700 to reduce (block 726) its transmission power level.

In some situations, the manager 220 identifies when communications by one of the static Bluetooth transceiver are being excessively interfered with by another proximately located static Bluetooth transceiver that is transmitting at an excessively high power level, and takes remedial actions to reduce the interference. The associated operations for controlling the transmission power levels used by the static Bluetooth transceiver 700 can include identifying, based on the measurement reports, that the static Bluetooth transceiver 700 is being subjected to communication interference that exceeds a defined rule. The operations responsive to that identification can include identifying an interfering one of the static Bluetooth transceivers that is proximately located to the interfered one of the static transceivers and identified as at least one source of the interference to the static Bluetooth transceiver 700, and communicating through the network a power control message addressed toward the interfering one of the static Bluetooth transceivers that contains a command to reduce the transmission power level used by the interfering one of the static Bluetooth transceivers and/or to reduce the transmission power level used by at least one of the mobile transceivers communicating with the interfering one of the static Bluetooth transceivers.

Figure 8:
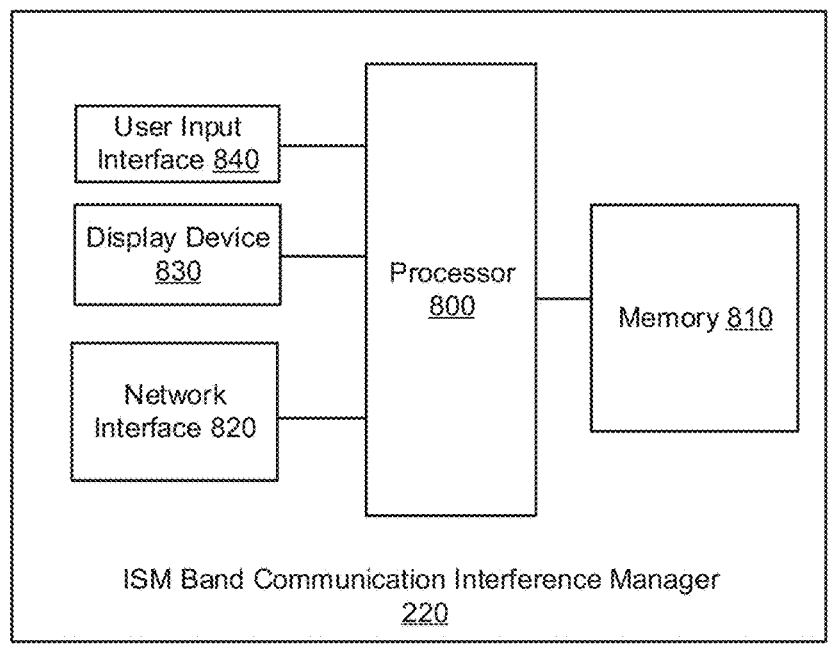
FIG. 8 is a block diagram of the ISM band communication interference manager of FIGS. 2-3 and 5 configured to operate in accordance with some embodiments of the present disclosure.

Example ISM Band Communication Interference Manager and Wireless Communication Equipment FIG. 8 is a block diagram of an ISM band communication interference manager that is configured to operate according to some embodiments of the present disclosure. The manager 220 includes a processor 800, a memory 810, and a network interface 820 which may include a radio access network transceiver (e.g., IEEE 802.11 transceiver, 3GPP LTE or other cellular transceiver, etc.) and/or a wired network interface (e.g., Ethernet interface). The network interface 820 is configured to communicate with the static transceivers.

The processor 800 may include one or more data processing circuits, such as a general purpose and/or special purpose processor (e.g., microprocessor and/or digital signal processor) that may be collocated or distributed across one or more networks. The processor 800 is configured to execute computer program code in the memory 810, described below as a non-transitory computer readable medium, to perform at least some of the operations described herein as being performed by an access control computer. The computer program code when executed by the processor 800 causes the processor 800 to perform operations in accordance with one or more embodiments disclosed herein for the manager 220 disclosed herein. The manager 220 may further include a user input interface 840 (e.g., touch screen, keyboard, keypad, etc.) and a display device 830.

Figure 9:
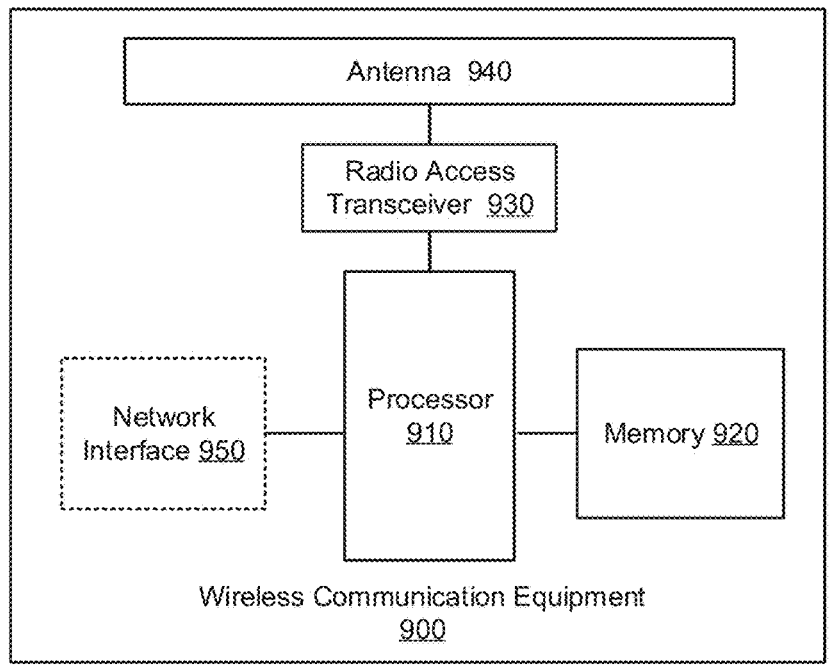
FIG. 9 is a block diagram of a wireless communication terminal containing a static ISM band transceiver and/or a mobile ISM band transceiver configured to operate in accordance with some embodiments of the present disclosure.

FIG. 9 is a block diagram of wireless communication equipment 900 that can be configured to operate as a wireless access point 150, a SVDU 110, a dockable wireless controller 200c, a wireless controller charging station 212, a remote audio unit 214, a dockable passenger control unit 200d, a passenger control unit docking station, or a passenger mobile terminal 200a-200b according to any one or more embodiments disclosed herein. The wireless communication equipment 900 includes a processor 910, a memory 920, a radio access transceiver 930, and an antenna 930. The wireless communication equipment 900 may further include a network interface 950 (e.g., Ethernet interface or other wired network interface). The radio access transceiver 930 can include, but is not limited to, a Bluetooth transceiver, a WLAN transceiver (IEEE 802.11 A-D, IEEE 802.11 A-C, or other IEEE 802.11), a LTE or other cellular transceiver, or other RF communication transceiver configured to communicate through the antenna 940 with other wireless communication equipment 900, such as a wireless access point 150, a SVDU 110, a dockable wireless controller 200c, a wireless controller charging station 212, a remote audio unit 214, a dockable passenger control unit 200d, a passenger control unit docking station, and/or a passenger mobile terminal 200a-200b. The wireless communication equipment 900 may also include a wired network interface 950 (e.g., Ethernet). The radio access transceiver 930 may thereby be termed a static or mobile transceiver depending upon which type of wireless communication equipment 900 it is integrated within.

The processor 900 may include one or more data processing circuits, such as a general purpose and/or special purpose processor (e.g., microprocessor and/or digital signal processor) that may be collocated or distributed across one or more networks. The processor 900 is configured to execute computer program code in the memory 910, described below as a non-transitory computer readable medium, to perform at least some of the operations described herein as being performed by an access control computer. The computer program code when executed by the processor 900 causes the processor 900 to perform operations in accordance with one or more embodiments disclosed herein for one or more of the wireless communication equipment.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An in-flight entertainment system comprising:
   a plurality of static transceivers spaced apart within an aircraft cabin and mounted to structures of the aircraft, the static transceivers are configured to transmit and receive radio frequency signals in the ISM band and to measure signals received within the ISM band from mobile transceivers within the aircraft and to measure signals received from proximately located ones of the static transceivers, and to generate measurement reports containing the measurements and containing identifiers of the proximately located ones of the static transceivers and the mobile transceivers; and
   an ISM band communication interference manager communicatively connected to the static transceivers, the ISM band communication interference manager comprising:
      a network interface that communicates with the static transceivers through a network;
      a processor coupled to the network interface; and
      a memory coupled to the processor and storing program code that when executed by the processor causes the processor to perform operations comprising:
         receiving the measurement reports from the static transceivers;
         generating a cabin layout map that identifies the distances and relative directions between the static transceivers;
         controlling transmission power levels used by the static transceivers and the mobile transceivers responsive to the content of the measurement reports and the cabin layout map.

2. The in-flight entertainment system of claim 1, wherein the measurement reports received from each of the static transceivers contain received signal strength measurements for signals received by the static transceiver from mobile transceivers and corresponding identifiers of the mobile transceivers from which the signals were received, and the operations further comprising:
   comparing the received signal strength measurements contained in the measurement reports to identify an interfering mobile transceiver having a transmission power level that satisfies a rule indicating excessive interference to a plurality of the static transceivers;
   identifying one of the static transceivers that is communicating with the interfering mobile transceiver; and
   communicating through the network a power control message addressed toward the identified one of the static transceivers that contains a command to reduce the transmission power level used by the interfering mobile transceiver.

3. The in-flight entertainment system of claim 2, the operations further comprising:
   determining from further received measurement reports from the identified one of the static transceivers that the interfering mobile transceiver has not reduced or sufficiently reduced its transmission power level responsive to the command; and
   generating a frequency change message communicated toward the identified one of the static transceivers for transmission to the interfering mobile transceiver that contains a command for the interfering mobile transceiver to use a frequency for transmission that is outside a group of frequencies that the ISM band communication interference manager is reserving for use by the static transceivers to communicate with mobile transceivers other than the interfering mobile transceiver.

4. The in-flight entertainment system of claim 1, wherein the measurement reports received from each of the static transceivers contain received signal strength measurements for signals received by the static transceiver from mobile transceivers and corresponding identifiers of the mobile transceivers from which the signals were received, and the operations further comprise:
   comparing the received signal strength measurements contained in the measurement reports to identify a first group of the static transceivers that are using transmission power levels that are more than a threshold amount greater than an average transmission power level used by a second group of the static transceivers that is proximately located to the first group of the static transceivers; and communicating through the network power control messages addressed toward the first group of the static transceivers that contain commands to reduce the transmission power level used by the first group of the static transceivers.

5. The in-flight entertainment system of claim 1, wherein the operations to control transmission power levels used by the static transceivers and the mobile transceivers, comprise:

identifying, based on the measurement reports, an interfered one of the static transceivers subjected to communication interference that exceeds a defined rule;

identifying one of the static transceivers proximately located to the interfered one of the static transceivers; and communicating through the network a power control message addressed toward the identified one of the static transceivers that contains a command to reduce the transmission power level used by the identified one of the static transceivers and/or to reduce the transmission power level used by at least one of the mobile transceivers communicating with the identified one of the static transceivers.

6. The in-flight entertainment system of claim 5, the operations further comprising:

determining the distances between the static transceivers based on received signal strength measurements indicated by the measurement reports of signals received by the static transceivers from other ones of the static transceivers; and determining the relative directions between the static transceivers based on triangulating the determined distances between the static transceivers identified by the measurement reports;

using the cabin layout map and relative strengths of the signals received by the static transceivers from the other static transceivers, to determine maximum transmission power levels that each of the static transceivers should stay below when transmitting to mobile transceivers; and communicating through the network power control messages addressed toward each of the static transceivers that contains a command indicating the maximum transmission power levels determined for the static transceiver.

7. The in-flight entertainment system of claim 5, the operations further comprising:

determining the distances between the static transceivers based on received signal strength measurements indicated by the measurement reports of signals received by the static transceivers from other ones of the static transceivers;

determining the relative directions between the static transceivers based on triangulating the determined distances between the static transceivers identified by the measurement reports;

determining, based on the cabin layout map and received signal strength measurements indicated by the measurement reports of signals received by the static transceivers from other ones of the static transceivers, transmission power levels that each of the static transceivers are using to communicate with mobile transceivers; and based on the transmission power levels that each of the static transceivers are determined to be using to communicate and based on the distances and relative directions between the static transceivers indicated by the cabin layout map, communicating through the network power control messages addressed toward the static transceivers that contain commands controlling the transmission power levels used by the static transceivers.

8. The in-flight entertainment system of claim 5, wherein the power control message contains a command to reduce the transmission power level used by a particular mobile transceiver communicating with the identified one of the static transceivers, and the operations further comprise:

identifying that the particular mobile transceiver is a rogue mobile transceiver based on it not reducing or sufficiently reducing its transmission power level responsive to the command; and generating a frequency change message communicated through the identified one of the static transceivers for transmission to the rogue mobile transceiver that contains a command for the rogue mobile transceiver to use a frequency for transmission that is outside a group of frequencies that the ISM band communication interference manager is reserving for use by the static transceivers to communicate with mobile transceivers other than the interfering mobile transceiver.

9. The in-flight entertainment system of claim 8, further comprising:

generating the frequency change message configured as a connection request message that identifies the frequency at which the rogue mobile transceiver is to transmit connection setup information to the identified one of the static transceivers.

10. The in-flight entertainment system of claim 8, further comprising:

generating the frequency change message configured as a pairing request message identifying the frequency at which the rogue mobile transceiver is to transmit pairing information to the identified one of the static transceivers.

11. The in-flight entertainment system of claim 8, wherein the operations for identifying that the particular mobile transceiver is a rogue mobile transceiver based on it not reducing or sufficiently reducing its transmission power level responsive to the command, comprise:

monitoring measurement reports received from the static transceivers to determine whether the mobile transceivers are sufficiently changing their transmission power levels responsive to the transmission power level control commands contained in the power control messages communicated through the static transceivers.

12. The in-flight entertainment system of claim 5, wherein the power control message contains a command to reduce the transmission power level used by a particular mobile transceiver communicating with the identified one of the static transceivers, and the operations further comprise:

identifying that the particular mobile transceiver is a rogue mobile transceiver based on it not reducing or sufficiently reducing its transmission power level responsive to the command;

further identifying that the rogue mobile transceiver is a passenger control unit (PCU) that is paired through a Bluetooth wireless link to a seat video display unit (SVDU) having a housing containing the identified one of the static transceiver; and responsive to the rouge mobile transceiver being a PCU, generating a passenger request message communicated to the SVDU that contains a request configured for display on a display device of the SVDU instructing a passenger to return the PCU to a dock device that associated with the SVDU and configured to releasably store the PCU.

13. The in-flight entertainment system of claim 5, wherein the power control message contains a command to reduce the transmission power level used by the identified one of the static transceivers to communicate with a particular mobile transceiver, and the operations further comprise:
    identifying that the particular mobile transceiver is a rogue mobile transceiver based on it sending signal measurement reports that incorrectly indicate low received signal strengths to the identified one of the static transceivers that are causing excessively high levels of transmission power from the identified one of the static transceivers; and
    generating a disregard report message communicated toward the identified one of the static transceivers instructing the identified one of the static transceivers to not use measurement reports that are received from the rogue mobile transceiver when determining what transmission power level the identified one of the static transceivers will use for transmissions.

14. An ISM band communication interference manager that controls transmission power levels from static and mobile transceivers, the ISM band communication interference manager comprising:
    a network interface that communicates with spaced apart static transceivers through a network, the static transceivers are configured to transmit and receive radio frequency signals in the ISM band;
    a processor coupled to the network interface; and
    a memory coupled to the processor and storing program code that when executed by the processor causes the processor to perform operations comprising:
        receiving measurement reports from the static transceivers, the measurement reports containing measurements of signals received in the ISM band by the static transceivers from mobile transceivers and received from proximately located ones of the static transceivers, and containing identifiers of the static transceivers and the mobile transceivers from which the signals were received;
        generating a cabin layout map that identifies the distances and relative directions between the static transceivers; and
        controlling transmission power levels used by the static transceivers and the mobile transceivers responsive to the content of the measurement reports and the cabin layout map.

15. The ISM band communication interference manager of claim 14, wherein the measurement reports received from each of the static transceivers contain received signal strength measurements for signals received by the static transceiver from mobile transceivers and corresponding identifiers of the mobile transceivers from which the signals were received, and the operations further comprising:
    comparing the received signal strength measurements contained in the measurement reports to identify an interfering mobile transceiver having a transmission power level that satisfies a rule indicating excessive interference to a plurality of the static transceivers;
    identifying one of the static transceivers that is communicating with the interfering mobile transceiver; and
    communicating through the network a power control message addressed toward the identified one of the static transceivers that contains a command to reduce the transmission power level used by the interfering mobile transceiver.

16. The ISM band communication interference manager of claim 15, the operations further comprising:
    determining from further received measurement reports from the identified one of the static transceivers that the interfering mobile transceiver has not reduced or sufficiently reduced its transmission power level responsive to the command; and
    generating a frequency change message communicated toward the identified one of the static transceivers for transmission to the interfering mobile transceiver that contains a command for the interfering mobile transceiver to use a frequency for transmission that is outside a group of frequencies that the ISM band communication interference manager is reserving for use by the static transceivers to communicate with mobile transceivers other than the interfering mobile transceiver.

17. The ISM band communication interference manager of claim 14, wherein the measurement reports received from each of the static transceivers contain received signal strength measurements for signals received by the static transceiver from mobile transceivers and corresponding identifiers of the mobile transceivers from which the signals were received, and the operations further comprise:
    comparing the received signal strength measurements contained in the measurement reports to identify a first group of the static transceivers that are using transmission power levels that are more than a threshold amount greater than an average transmission power level used by a second group of the static transceivers that is proximately located to the first group of the static transceivers; and
    communicating through the network power control messages addressed toward the first group of the static transceivers that contain commands to reduce the transmission power level used by the first group of the static transceivers.

18. The ISM band communication interference manager of claim 14, wherein the operations to control transmission power levels used by the static transceivers and the mobile transceivers, comprise:
    identifying, based on the measurement reports, an interfered one of the static transceivers subjected to communication interference that exceeds a defined rule;
    identifying one of the static transceivers proximately located to the interfered one of the static transceivers; and
    communicating through the network a power control message addressed toward the identified one of the static transceivers that contains a command to reduce the transmission power level used by the identified one of the static transceivers and/or to reduce the transmission power level used by at least one of the mobile transceivers communicating with the identified one of the static transceivers.

19. The ISM band communication interference manager of claim 18, the operations further comprising:
    determining the distances between the static transceivers based on received signal strength measurements indicated by the measurement reports of signals received by the static transceivers from other ones of the static transceivers;

determining the relative directions between the static transceivers based on triangulating the determined distances between the static transceivers identified by the measurement reports;

using the cabin layout map and relative strengths of the signals received by the static transceivers from the other static transceivers, to determine maximum transmission power levels that each of the static transceivers should stay below when transmitting to mobile transceivers; and communicating through the network power control messages addressed toward each of the static transceivers that contains a command indicating the maximum transmission power levels determined for the static transceiver.

20. The ISM band communication interference manager of claim 18, the operations further comprising:

determining the distances between the static transceivers based on received signal strength measurements indicated by the measurement reports of signals received by the static transceivers from other ones of the static transceivers;

determining the relative directions between the static transceivers based on triangulating the determined distances between the static transceivers identified by the measurement reports;

determining, based on the cabin layout map and received signal strength measurements indicated by the measurement reports of signals received by the static transceivers from other ones of the static transceivers, transmission power levels that each of the static transceivers are using to communicate with mobile transceivers; and based on the transmission power levels that each of the static transceivers are determined to be using to communicate and based on the distances and relative directions between the static transceivers indicated by the cabin layout map, communicating through the network power control messages addressed toward the static transceivers that contain commands controlling the transmission power levels used by the static transceivers.

21. The ISM band communication interference manager of claim 18, wherein the power control message contains a command to reduce the transmission power level used by a particular mobile transceiver communicating with the identified one of the static transceivers, and the operations further comprise:

identifying that the particular mobile transceiver is a rogue mobile transceiver based on it not reducing or sufficiently reducing its transmission power level responsive to the command; and generating a frequency change message communicated through the identified one of the static transceivers for transmission to the rogue mobile transceiver that contains a command for the rogue mobile transceiver to use a frequency for transmission that is outside a group of frequencies that the ISM band communication interference manager is reserving for use by the static transceivers to communicate with mobile transceivers other than the interfering mobile transceiver, wherein the frequency change message is generated to be configured as a connection request message that identifies the frequency at which the rogue mobile transceiver is to transmit connection setup information to the identified one of the static transceivers.

22. The ISM band communication interference manager of claim 21, wherein the identifying that the particular mobile transceiver is a rogue mobile transceiver based on it not reducing or sufficiently reducing its transmission power level responsive to the command, and the operations further comprise:

monitoring measurement reports received from the static transceivers to determine whether the mobile transceivers are sufficiently changing their transmission power levels responsive to the transmission power level control commands contained in the power control messages communicated through the static transceivers.

23. The ISM band communication interference manager of claim 18, wherein the power control message contains a command to reduce the transmission power level used by a particular mobile transceiver communicating with the identified one of the static transceivers, and the operations further comprise:

identifying that the particular mobile transceiver is a rogue mobile transceiver based on it not reducing or sufficiently reducing its transmission power level responsive to the command;

further identifying that the rogue mobile transceiver is a passenger control unit (PCU) that is paired through a Bluetooth wireless link to a seat video display unit (SVDU) having a housing containing the identified one of the static transceiver; and responsive to the rouge mobile transceiver being a PCU, generating a passenger request message communicated to the SVDU that contains a request configured for display on a display device of the SVDU instructing a passenger to return the PCU to a dock device that associated with the SVDU and configured to releasably store the PCU.

24. The ISM band communication interference manager of claim 18, wherein the power control message contains a command to reduce the transmission power level used by the identified one of the static transceivers to communicate with a particular mobile transceiver, and the operations further comprise:

identifying that the particular mobile transceiver is a rogue mobile transceiver based on it sending signal measurement reports that incorrectly indicate low received signal strengths to the identified one of the static transceivers that are causing excessively high levels of transmission power from the identified one of the static transceivers; and generating a disregard report message communicated toward the identified one of the static transceivers instructing the identified one of the static transceivers to not use measurement reports that are received from the rogue mobile transceiver when determining what transmission power level the identified one of the static transceivers will use for transmissions.

* * * * *